Figure 1:
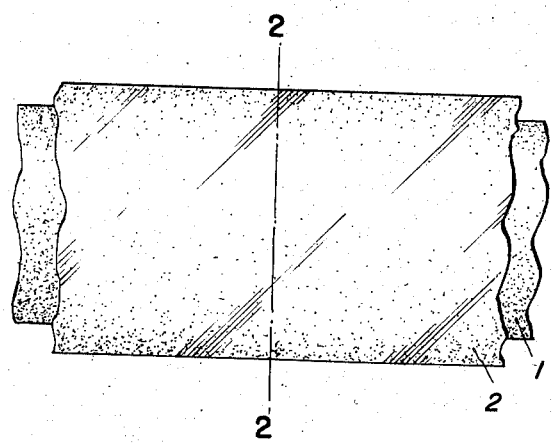

INVENTORS
DRURY NORMAN DAVIES &
LESLIE FRANCIS BULL

ATTORNEYS

United States Patent Office 2,873,226
Patented Feb. 10, 1959

2,873,226

METHOD OF MAKING GLASS REINFORCED PLASTIC ARTICLES

Drury Norman Davies, Englefield Green, and Leslie Francis Bull, Southgate, London, England, assignors to The Distillers Company Limited, Edinburgh, Scotland, a British company Application February 4, 1955, Serial No. 486,228

Claims priority, application Great Britain February 11, 1954

8 Claims. (Cl. 154—83)

The present invention relates to improvements in or relating to the production of reinforced plastic articles. In particular it relates to articles made from glass fibres and filaments bonded together with a laminating composition comprising an unsaturated polyester resin mixed with a monomeric styrene compound. By styrene compound is meant throughout this specification styrene or a polymerisable derivative thereof. Examples of such compounds include the vinyl toluenes, $\alpha$-methylstyrene, the ethyl substituted styrenes and the mono- and di- chlor- nuclear substituted styrenes.

It is known to use glass fibres and filaments in the form of yarns, rovings, mats and fabrics in the production of reinforced plastic articles in which the laminating compositions comprise unsaturated polyester resins mixed with monomeric styrene compounds. Such articles have excellent mechanical properties combining high tensile strengths with low densities.

A procedure for preparing such articles is the "lay-up" technique in which the glass fibres, in the form of mats, rovings or woven fabric, are bonded together with laminating compositions in syrup form and shaped in a female mould or on a male mould, the mould being removed after the resin has set, to produce a rigid article whose shape on one side at least is an accurate replica of the mould surface. If the shape of the mould surface is such as to present undercuts it is often necessary to take special measures to permit the removal of the mould from the rigid shaped article. For instance female moulds may be made in two or more sections which are screwed or otherwise fastened together in order to facilitate the removal of the article. In the case of male moulds, especially when the mould is cylindrical, spherical or bottle shaped, the special measures taken to ease the final removal of the mould are even more complex and require the use of, for instance, moulds having sliding tapered members or having segments of fusible material, for example, wax or low melting point resins or metals, which can be subsequently melted to allow removal of the mould from the finished article.

The difficulty of the separation of the finished article from the mould is often present in the manufacture of tubular shaped articles by winding glass fibres around a mandrel and bonding them by means of a laminating composition. The cure of the laminating composition often involves some contraction and consequently it is often impossible to remove the finished article from the mandrel owing to the frictional forces set up between them.

In the case of hollow articles of spherical or bottle shape made by the building up of bonded glass fibres around a male former, nothing short of complete disintegration of the former may be sufficient to enable it to be removed.

Special measures such as those outlined above involve high costs in the production of moulds and in their operation.

An object of the present invention is to provide a process for the manufacture of reinforced plastic articles in which the above-mentioned difficulties do not arise.

Accordingly, the present invention provides a process for the production of a reinforced plastic article which comprises forming the article either in a mould or on a former from fibrous glass material bonded together by an unsaturated polyester resin laminating composition containing a monomeric styrene compound characterised in that the mould or former is made of a polymerised styrene compound and is adapted to become part of the produced reinforced plastic article.

Any suitable technique, such as those known in the art may be applied to the formation of the reinforced plastic article in or on the mould or former.

The fibrous glass material may take any suitable form such as mats, rovings or woven fabrics.

The laminating compositions used in the process of the present invention are well known per se and may be of any suitable type which comprises an unsaturated polyester resin mixed with a monomeric styrene compound. By "unsaturated polyester resin" is meant throughout this specification a resin the molecules of which each contain at least 2 ester groups and two ethylenically unsaturated portions through which interpolymerisation among themselves and with the monomeric styrene compound may take place. Such unsaturated polyester resins are prepared by the interesterification of suitable dibasic or polybasic acids with suitable alcohols to give polyesters in which either the alcoholic or the acidic portion thereof possess the ethylenic unsaturation. One class of polyester resins may be derived from the esterification of saturated dibasic acids, such as phthalic acid, adipic acid, succinic acid or sebacic acid, with unsaturated alcohols such as allyl or substituted allyl alcohols. Another class of unsaturated polyester resins which is particularly valuable in the production of laminating or impregnating compositions may be obtained by esterifying saturated polyhydric alcohols, such as ethylene glycol, diethylene glycol, trimethylene glycol, 1,2-propylene glycol, 1:4-butylene glycol, 1:3-butylene glycol and glycerol with $\alpha$-unsaturated $\alpha,\beta$-dicarboxylic acids, such as maleic, fumaric, itaconic and citraconic acids. Suitable unsaturated polyester resins may be prepared from mixtures of the above polyhydric alcohols and unsaturated dicarboxylic acids. This type of unsaturated polyester resin may be modified by replacing some of the unsaturated dibasic acids with an equivalent quantity of a saturated acid, such as succinic, adipic, sebacic, phthalic, azelaic, tetrahydrophthalic or endomethylene tetrahydrophthalic acids.

The proportion of unsaturated polyester resin to monomeric styrene compound in the production of such laminating compositions has been widely varied, but generally such compositions contain between 20 and 90% by weight of the unsaturated polyester resin.

The mould or former used in the process of the present invention is made of a polymerised styrene compound. Most suitably polymerised styrene is used either in the form of polystyrene or of a copolymer of styrene. Copolymers containing a major proportion of styrene and having a greater toughness than polystyrene are particularly suitable for the process of the present invention. Styrene compounds may be copolymerised among themselves or with other monomeric compounds to produce copolymers suitable for the production of moulds and formers. Such monomeric compounds include butadiene, isoprene, chloroprene, acrylonitrile and the like. It is further possible to modify the polymerised styrene compound from which the mould or former is to be made by the addition thereto of fillers and the like or by the addition thereto of other resinous products such as rubber.

The polymerised styrene compound may be formed into a mould or former suitable for use in the process of the present invention by any of the conventional techniques applied to the formation of shaped articles from styrene compound polymers and copolymers. For instance, cast slabs of a polymerised styrene compound may be machined to the desired shape or they may be cast in the desired shape in the first place. Alternatively the polymerised styrene compound may be shaped by a conventional pressure moulding, or injection moulding technique or an extrusion technique or by blowing a tube of the hot polymerised styrene compound to the desired shape.

The mould or former used in the process of the present invention is adapted to become part of the produced reinforced plastic article and, therefore, it is generally made as light and as thin as possible having regard for the strains to which it will be subjected during the manufacture of the article. In this way the bulk and weight of the produced article will be a minimum having regard to its mechanical strength which depends primarily upon the laminated fibrous glass portion thereof.

The process of the present invention can be particularly adapted for the production of reinforced plastic articles, such as conductors or containers, which have to withstand high fluid pressures. Such articles, as hitherto produced from fibrous glass material and suitable laminating compositions, although they have sufficient mechanical strength, suffer from the disadvantage that they exhibit permeability to the high pressure liquids or gases contained therein. Polymerised styrene compounds, on the other hand, are substantially impermeable to such fluids and, therefore, if the mould or former is made from a polymerised styrene compound in such a way that in the produced article the fluid under pressure only contacts the polymerised styrene compound, the resultant article combines both the strength of the laminated fibrous glass and the impermeability of the polymerised styrene compound.

The reinforced plastic articles produced by the process of the present invention are particularly valuable and long-lasting in use because the mould or former made from the polymerised styrene compound is integrally attached to the bonded fibrous glass portion of the article. The presence of the monomeric styrene compound in the laminating composition appears initially to soften the surfaces of the mould or former with which it comes into contact and thus when the laminating composition is cured to its final state it is integrally and possibly chemically bonded to the mould or former.

The following examples illustrate the production of reinforced plastic articles by the process of the present invention.

Example 1

A hollow battery cell was prepared by forming an inner shell from polystyrene which thereafter acted as a male mould on which the fibre glass reinforced battery cell was built up from glass fibres bonded together with a laminating composition comprising 7 parts by weight of the following unsaturated polyester resin and 5 parts by weight of monomeric styrene, the curing catalyst being methyl ethyl ketone peroxide. The polyester was prepared in the usual way by stirring and heating 100 parts of diethylene glycol with 18 parts of phthalic anhydride and 72 parts of maleic anhydride at 210° C. until the esterification was substantially complete (the acid value dropped to 35 mg. KOH/gm.).

This battery cell was extremely light and strong and was completely impervious to the sulphuric acid electrolyte used in the battery. A similar battery cell made from the same laminating composition on a conventional mould which was not incorporated in the final cell did not remain continuously impervious to the electrolyte in use.

Example 2

Hollow laminated spheres to contain water under high pressure are formed on thin inner shells of polystyrene which have been formed by injection moulding or by blowing from a hot extruded tube of polystyrene. The thin inner shell provides a male former around which the fibre glass laminated article is built up by wrapping a chopped glass fibre mat which had been impregnated with an unsaturated polyester resin composition containing a curing catalyst. When the spheres have been built up to the desired size the polyester resin is allowed to cure under the influence of the catalyst. The unsaturated polyester resin composition was prepared by mixing 3 moles of maleic anhydride with 1 mole of sebacic acid and 4 moles of diethylene glycol and heating the mixture in a well stirred flask under an atmosphere of carbon dioxide for 6 hours at 200° C. During this time water was evolved and the acid value fell to 30 to 40 mg. KOH/gm. The product was then allowed to cool and thinned with half its weight of styrene containing 500 parts per million of tertiary butyl catechol (T. B. C.).

To 150 parts of the resulting mixture was added 1 part of benzoyl peroxide and 0.1 part of dimethyl aniline as curing catalysts.

Example 3

Figure 2:
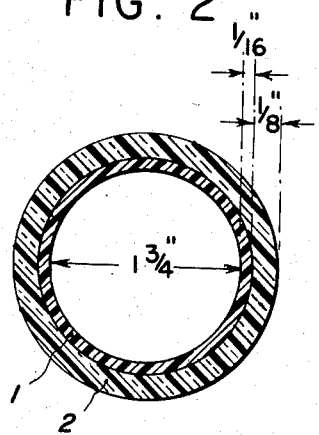

Figures 1 and 2 illustrate a reinforced tube according to the present invention. Figure 1 is a perspective view of the tube and Figure 2 is a diagram of its cross-section.

(1) is a polystyrene tube which has been formed by extrusion and (2) is the bonded fibre glass reinforcement to the tube.

The reinforced tube is built up by wrapping the polystyrene tube with a fibre glass fabric (Y.93 T.5 as manufactured by Fothergill and Harvey) which, just before application to the tube, is impregnated with a laminating composition similar to that employed in Example 1 and containing a curing catalyst. The impregnated glass cloth is wound around the tube until the desired thickness is built up and the whole is set aside to cure.

In the appended claims, the term "mold" is intended to refer to a matrix on which the article is formed as well as a matrix in which the article is formed.

We claim:

1. A process for the production of a fibrous glass reinforced plastic article, which comprises laminating a layer of a liquid unsaturated polyester resin composition containing fibrous glass reinforcement, a monomeric styrene compound and a curing catalyst therefor, onto a forming member consisting of a polymerized styrene, and bonding said layer to said forming member by polymerizing the layer to form a hard unitary plastic article of the desired shape, whereby the resultant polymerized styrene in said layer is integrated with the polymerized styrene in said forming member and the latter constitutes an integral part of the article produced.

2. A process as claimed in claim 1, wherein the unsaturated polyester resin of said unsaturated polyester resin composition is prepared by the interesterification of an $\alpha$-unsaturated, $\alpha,\beta$-dicarboxylic acid and a saturated polyhydric alcohol.

3. A process as claimed in claim 2, wherein the unsaturated acid is maleic acid and the polyhydric alcohol is selected from the group consisting of ethylene glycol, diethylene glycol, trimethylene glycol, 1,2-propylene glycol, 1:4-butylene glycol and 1:3-butylene glycol.

4. A process as claimed in claim 1, wherein the monomeric styrene compound is styrene.

5. A process as claimed in claim 1, wherein said forming member is made from a member of the group consisting of polystyrene and copolymers containing a major proportion of styrene and having a greater toughness than polystyrene.

6. A shaped article comprising a body of fibrous glass material bonded together by a cured unsaturated polyester resin laminating composition containing an initially monomeric styrene compound and a curing catalyst therefor and being directly integrated on one surface thereof with a correspondingly shaped layer consisting of a polymerised styrene compound.

7. A process as claimed in claim 1, wherein the said forming member consisting of a polystyrene is an inner shell around which the laminated layer is built up.

8. A shaped article as claimed in claim 6, wherein the said last-named layer is a discontinuous layer.

References Cited in the file of this patent

UNITED STATES PATENTS

| | | |
|---|---|---|
| 1,985,997 | Keeran | Jan. 1, 1935 |
| 2,019,890 | Burke | Nov. 5, 1935 |
| 2,044,356 | Keeran | June 16, 1936 |
| 2,224,852 | Lowry | Dec. 17, 1940 |
| 2,429,340 | Bailey | Oct. 21, 1947 |
| 2,510,908 | Schubert et al. | June 6, 1950 |
| 2,534,617 | Mohrman | Dec. 19, 1950 |
| 2,596,184 | Sutton | May 13, 1952 |
| 2,614,058 | Francis | Oct. 14, 1952 |
| 2,630,868 | Ellenberger | Mar. 10, 1953 |
| 2,805,181 | Groff et al. | Sept. 3, 1957 |